US008340941B2

(12) United States Patent
Jackson et al.

(10) Patent No.: US 8,340,941 B2
(45) Date of Patent: Dec. 25, 2012

(54) TEMPERATURE MEASUREMENT SYSTEM FOR A LIGHT EMITTING DIODE (LED) ASSEMBLY

(75) Inventors: Steve Jackson, Mount Joy, PA (US); Robert Rix, Hershey, PA (US); Bruce Pelton, Laguna Niguel, CA (US); Mohammad S. Ahmed, Harrisburg, PA (US); Ronald Martin Weber, Annville, PA (US); Matthew E. Mostoller, Hummelstown, PA (US)

(73) Assignee: Tyco Electronics Corporation, Berwyn, PA (US)

( * ) Notice: Subject to any disclaimer, the term of this patent is extended or adjusted under 35 U.S.C. 154(b) by 90 days.

(21) Appl. No.: 12/794,104

(22) Filed: Jun. 4, 2010

(65) Prior Publication Data

US 2011/0301909 A1 Dec. 8, 2011

(51) Int. Cl.
*G01K 13/00* (2006.01)

(52) U.S. Cl. ........ 702/133; 315/149; 315/294; 315/360; 315/362; 315/291; 315/297; 362/20; 257/79; 257/81

(58) Field of Classification Search .................. 702/133; 315/152, 149, 291, 159, 297, 160, 175, 309, 315/247, 293, 294, 360, 224, 362; 362/20, 362/249.02, 806; 257/79, 81, 82, 88, 99
See application file for complete search history.

(56) References Cited

U.S. PATENT DOCUMENTS

| 5,714,738 | A | * | 2/1998 | Hauschulz et al. | 219/535 |
|---|---|---|---|---|---|
| 7,800,315 | B2 | * | 9/2010 | Shteynberg et al. | 315/291 |
| 7,851,818 | B2 | * | 12/2010 | Kuhmann | 257/98 |
| 7,880,400 | B2 | * | 2/2011 | Zhou et al. | 315/247 |
| 7,902,758 | B2 | * | 3/2011 | Woodward et al. | 315/82 |
| 7,956,554 | B2 | * | 6/2011 | Shteynberg et al. | 315/293 |
| 8,033,686 | B2 | * | 10/2011 | Recker et al. | 362/249.02 |
| RE42,876 | E | * | 11/2011 | Heffel et al. | 123/1 A |
| 2007/0040518 | A1 | * | 2/2007 | Young | 315/309 |
| 2007/0040696 | A1 | * | 2/2007 | Mubaslat et al. | 340/657 |
| 2009/0079357 | A1 | * | 3/2009 | Shteynberg et al. | 315/291 |
| 2009/0079358 | A1 | * | 3/2009 | Shteynberg et al. | 315/291 |
| 2009/0079359 | A1 | * | 3/2009 | Shteynberg et al. | 315/291 |
| 2009/0079360 | A1 | * | 3/2009 | Shteynberg et al. | 315/291 |
| 2009/0079362 | A1 | * | 3/2009 | Shteynberg et al. | 315/294 |
| 2010/0007277 | A1 | * | 1/2010 | Woodward et al. | 315/77 |
| 2010/0032702 | A1 | * | 2/2010 | Lahijani | 257/98 |
| 2010/0141153 | A1 | * | 6/2010 | Recker et al. | 315/149 |
| 2010/0176746 | A1 | * | 7/2010 | Catalano et al. | 315/297 |
| 2010/0277077 | A1 | * | 11/2010 | Pong et al. | 315/152 |
| 2011/0115394 | A1 | * | 5/2011 | Shteynberg et al. | 315/250 |

* cited by examiner

Primary Examiner — Carol Tsai (57) ABSTRACT

A temperature measurement system is provided for a light emitting diode (LED) assembly that includes an LED having two semiconductors joined together at an LED junction. The system includes a temperature sensor operatively connected to the LED assembly at a remote location that is remote from the LED junction. The temperature sensor is configured to measure a temperature of the LED assembly at the remote location. A temperature calculation module is operatively connected to the temperature sensor for receiving the measured temperature at the remote location from the temperature sensor. The temperature calculation module is configured to determine a junction temperature at the LED junction based on the measured temperature a the remote location.

22 Claims, 3 Drawing Sheets

TEMPERATURE MEASUREMENT SYSTEM FOR A LIGHT EMITTING DIODE (LED) ASSEMBLY

BACKGROUND OF THE INVENTION

The subject matter described and/or illustrated herein relates generally to light emitting diodes (LEDs), and more particularly, to temperature measurement systems for LEDs.

LEDs are being used to replace other lighting systems that use other types of light sources, such as incandescent or fluorescent lamps. LEDs offer advantages over lamps, for example rapid turn-on, rapid cycling (on-off-on) times, long useful life span, low power consumption, narrow emitted light bandwidths that eliminate the need for color filters to provide desired colors, and so on. LEDs are among the longest lasting light sources now available, for example with a useful life span measured in tens of thousands of hours. But, LEDs do experience a gradual reduction in light output over a life span, which is commonly referred to as "light output degradation." Light output degradation may result from a reduction in the light emitting efficiency of the LED and/or from a reduction in the light transmission of the optical path within an LED.

Relatively high operating temperatures may adversely affect the performance of LEDs. For example, relatively high operating temperatures may increase the rate of light output degradation experienced by LEDs, which may shorten the useful life span of an LED and/or decrease the light output of the LED at a given point in time during the life span. Accordingly, it is important to draw heat away from LEDs to reduce the rate of light output degradation experienced thereby, such as by using a heat sink, fan, and/or the like. One particular area where operating temperatures need to be controlled to prevent adversely affecting the performance of an LED is a junction within the LED. Specifically, LEDs typically include p-type and n-type semiconductors joined together at a junction. Relatively high temperatures generated at the junction of the LED may be especially problematic with respect to increasing the rate of light output degradation experienced by the LED.

Accordingly, there is a need for monitoring the operating temperature of an LED to determine if enough heat is being drawn away from the LED to prevent an increased rate of light output degradation. For example, there is a need for monitoring the operating temperature at a junction of p-type and n-type semiconductors within an LED.

BRIEF DESCRIPTION OF THE INVENTION

In one embodiment, a temperature measurement system is provided for a light emitting diode (LED) assembly that includes an LED having two semiconductors joined together at an LED junction. The system includes a temperature sensor operatively connected to the LED assembly at a remote location that is remote from the LED junction. The temperature sensor is configured to measure a temperature of the LED assembly at the remote location. A temperature calculation module is operatively connected to the temperature sensor for receiving the measured temperature at the remote location from the temperature sensor. The temperature calculation module is configured to determine a junction temperature at the LED junction based on the measured temperature at the remote location.

In another embodiment, a method is provided for determining the junction temperature of a light emitting diode (LED) assembly that includes an LED having two semiconductors joined together at an LED junction. The method includes measuring a temperature at a remote location of the LED assembly that is remote from the LED junction using a temperature sensor, receiving the measured temperature at the remote location of the LED assembly at a temperature calculation module, and determining the junction temperature at the LED junction of the LED assembly based on the measured temperature at the remote location using the temperature calculation module.

In another embodiment, a light emitting diode (LED) assembly includes an LED including a body having a mounting side configured to be mounted on a printed circuit board. The body includes an electrical contact extending along the mounting side, and a thermal pad extending along the mounting side proximate the electrical contact. A temperature sensor is operatively connected to the body of the LED at the thermal pad.

DETAILED DESCRIPTION OF THE INVENTION

Figure 1:
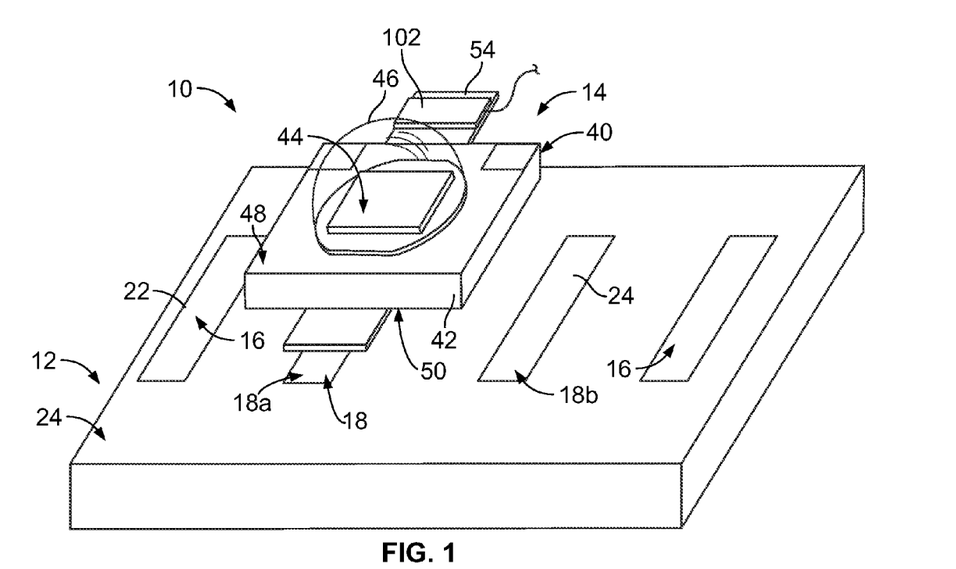
FIG. 1 is a partially exploded perspective view of an exemplary light emitting diode (LED) assembly.

FIG. 1 is a partially exploded perspective view of an exemplary light emitting diode (LED) assembly 10. The LED assembly 10 includes a printed circuit board (PCB) 12 and an LED 14 mounted on the PCB 12. The PCB 12 includes a plurality of power contacts 16 for receiving electrical power from a power source (not shown) to drive operation of the LED 14. The PCB 12 also includes a plurality of LED contacts 18 for electrically connecting the LED 14 to the PCB 12. Each of the LED contacts 18 is electrically connected to a corresponding power contact 16 for routing electrical power from the power source to the LED 14. The LED contacts 18 include an anode contact 18a and a cathode contact 18b, each of which extends along the PCB 12 for engagement with a corresponding mating contact 20 (FIG. 3) of the LED 14.

Each of the power contacts 16 and each of the LED contacts 18 may be positioned at any other location on the PCB 12 than shown. In the exemplary embodiment, each of the power contacts 16 and the LED contacts 18 includes a respective solder pad 22 and 24 for being electrically connected to the power source and the mating contacts 20, respectively, using a solder connection. In addition or alternatively, the power contacts 16 and/or the LED contacts 18 include other contact structures (not shown), such as, but not limited to, surface mount pads, vias that receive solder pins, vias that receive press-fit pins, and/or the like. Any number of the power contacts 16 and any number of the LED contacts 18 may be provided.

The LED 14 includes a body 40 that includes a case 42, one or more light emitting elements 44, an optional lens 46, and the mating contacts 20. The light emitting element 44, the lens 46, and the mating contacts 20 are held by the case 42, which includes opposite sides 48 and 50. The light emitting element 44 extends along the side 48 of the case 42 for emitting light outwardly from the side 48. The lens 46 is mounted on the side 48 of the case 42 over the light emitting element 44 for conditioning light emitted by the element 44. The side 50 is configured to be mounted on the PCB 12 and may be referred to herein as a "mounting side".

Figure 2:
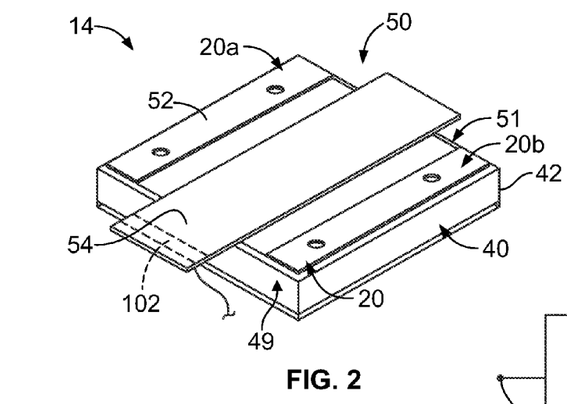
FIG. 2 is a perspective view of an exemplary LED of the LED assembly shown in FIG. 1.

FIG. 2 is a perspective view of the LED 14 illustrating the side 50 of the case 42. The LED 14 includes the mating contacts 20, which include an anode contact 20*a* and a cathode contact 20*b*. The anode and cathode contacts 20*a* and 20*b*, respectively, are electrically connected to the light emitting element 44 (FIG. 1) of the LED 14. When the LED 14 is mounted on the PCB 12 (FIGS. 1 and 4-6), the anode contact 20*a* of the LED 14 is electrically connected to the anode contact 18*a* (FIG. 1) of the PCB 12, and the cathode contact 20*b* of the LED 14 is electrically connected to the cathode contact 18*b* (FIG. 1) of the PCB 12. In the exemplary embodiment, the mating contacts 20 include solder pads 52 for being electrically connection to the LED contacts 18 of the PCB 12 using a solder connection. In addition or alternatively, the mating contacts 20 include other contact structures (not shown), such as, but not limited to, surface mount pads, solder pins that are received within vias of the PCB 12, press-fit pins that are received within vias of the PCB 12, and/or the like. The LED 14 may include any number of the mating contacts 20. Each of the mating contacts 20 may be referred to herein as an "electrical contact".

Figure 3:
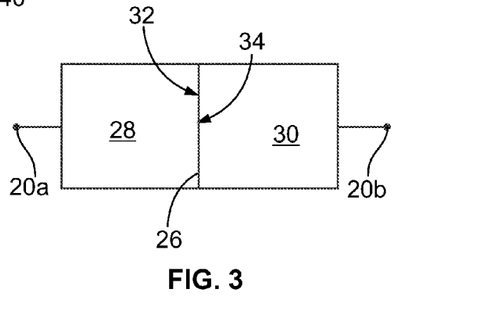
FIG. 3 is a schematic diagram of a portion of the LED shown in FIG. 2 illustrating an exemplary embodiment of a junction of the LED.

As can be seen in FIG. 2, the anode contact 20*a* is spaced apart from the cathode contact 20*b* along the side 50 of the case 42. The LED 14 includes a thermal pad 54 that is positioned along the side 50 of the case 42 between the anode and cathode contacts 20*a* and 20*b*, respectively. The thermal pad 54 is electrically isolated from the anode contact 20*a* and the cathode contact 20*b*. The thermal pad 54 may facilitate drawing heat away from the LED 14 via engagement with the PCB 12. As will be described below, in some embodiments, a temperature sensor 102 is operatively connected to thermal pad 54 for measuring a temperature of the LED body 40 at the thermal pad 54, which is used to determine a temperature at the LED junction 26 (FIG. 3). Optionally, the thermal pad 54 extends outwardly past one or both of a pair of opposite edges 49 and 51 of the case 42 of the LED 14 to facilitate mounting the temperature sensor 102 on the thermal pad 54.

Figure 4:
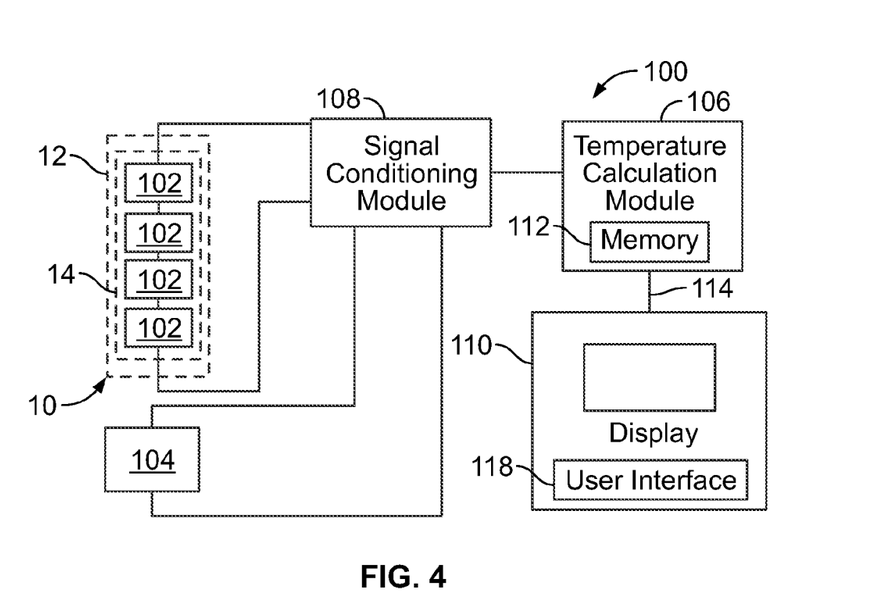
FIG. 4 is a schematic diagram of an exemplary embodiment of a temperature measurement system for the LED assembly shown in FIG. 1.

FIG. 3 is a schematic diagram of a portion of the LED 14 illustrating an exemplary embodiment of a junction 26 of the LED 14. Within the case 42 (FIGS. 1 and 2), the LED 14 includes a p-type semiconductor 28 and an n-type semiconductor 30. The semiconductors 28 and 30 are joined together at the LED junction 26. Specifically, the p-type semiconductor 28 includes a side 32, while the n-type semiconductor 30 includes a side 34. The semiconductors 28 and 30 are jointed together such that the side 32 of the p-type semiconductor 28 faces and engages the side 34 of the n-type semiconductor 32. The interface between the sides 32 and 34 of the semiconductors 28 and 30, respectively, defines the LED junction 26. The anode contact 20*a* of the LED 14 is electrically connected to the p-type semiconductor 28, while the cathode contact 20*b* is electrically connected to the n-type semiconductor 30. As will be described in more detail below, an operating temperature of the LED 14 at the LED junction 26 is determined using a temperature measurement system 100 (FIG. 4). In an alternative embodiment, the LED junction 26 is located at the interface between the anode contact 18*a* of the PCB 12 and the anode contact 18*b* of the LED 14, and/or the LED junction 26 is located at the interface between the cathode contact 18*b* of the PCB 12 and the cathode contact 20*b* of the LED 14.

FIG. 4 is a schematic diagram of an exemplary embodiment of the temperature measurement system 100. The system 100 includes one or more of the temperature sensors 102, one or more reference sensors 104, a temperature calculation module 106, an optional signal conditioning module 108, and an optional display module 110. As will be described below, the system 100 is configured to measure a temperature at one or more remote locations of the LED assembly 10 that are remote from the LED junction 26 (FIG. 3), and determine a junction temperature at the junction 26 based on the measured temperature(s) at the remote location(s).

The temperature sensors 102 are operatively connected to the LED assembly 10 at a remote location of the LED assembly 10 that is remote from the LED junction 26. When more than one temperature sensor 102 is provided, each sensor 102 may be operatively connected to the LED assembly 10 at the same remote location as one or more other sensors 102 and/or at a different remote location than one or more other sensors 102. In the exemplary embodiment, each of the temperature sensors 102 is operatively connected to the thermal pad 54 of the LED 14. Accordingly, in the exemplary embodiment, the remote location of each of the temperature sensors 102 is the thermal pad 54. However, each temperature sensor 102 may be operatively connected at any other location on the LED assembly 10 that is remote from the LED junction 26. For example, other remote locations of a temperature sensor 102 may include, but are not limited to, another location (besides the thermal pad 54) on the side 50 of the LED body 40, the side 48 of the body 40, an edge (e.g., the edge 49, the edge 51, and/or the like) of the body 40 that extends between the sides 48 and 50, the lens 46, anywhere on the PCB 12, and/or the like. Optionally, one or more of the temperature sensors 102 may be operatively connected to a component (not shown) that is external to the LED assembly 10 for measuring a differential temperature between the component and the LED junction 26. For example, one or more temperature sensors 102 may be operatively connected to a heat sink (not shown) for measuring a differential temperature between the heat sink and the LED junction 26. By "operatively connected", it is meant that the sensor 102 is configured to measure a temperature at the corresponding remote location of the LED assembly 10. As used herein, the term "remote location" is intended to mean a location on the LED assembly 10 that is located any distance other than zero from the LED junction 26.

Each temperature sensor 102 may be any type of sensor. In the exemplary embodiment of FIG. 4, the temperature sensors 102 are thermocouples. Other examples of the temperature sensors 102 include, but are not limited to, resistance temperature detectors (RTDs), smart temperature monitoring integrated circuits, negative temperature coefficient (NTC) sensors, positive temperature coefficient (PTC) sensors, and/or the like. Examples of thermocouples include, but are not limited to, type C, type E, type J, type K, type M, type N, type T, platinum type B, platinum type R, platinum type S, chromel-gold/iron, type PT100, type PT1000, chip resistors, and/or the like. Examples of RTDs include, but are not limited to, carbon resistors, film thermometers, wire-wound thermometers, coil elements, chip resistors, and/or the like.

Although four temperature sensors 102 are shown in FIG. 3, the system 100 may include any number of temperature sensors 102.

Figure 5:
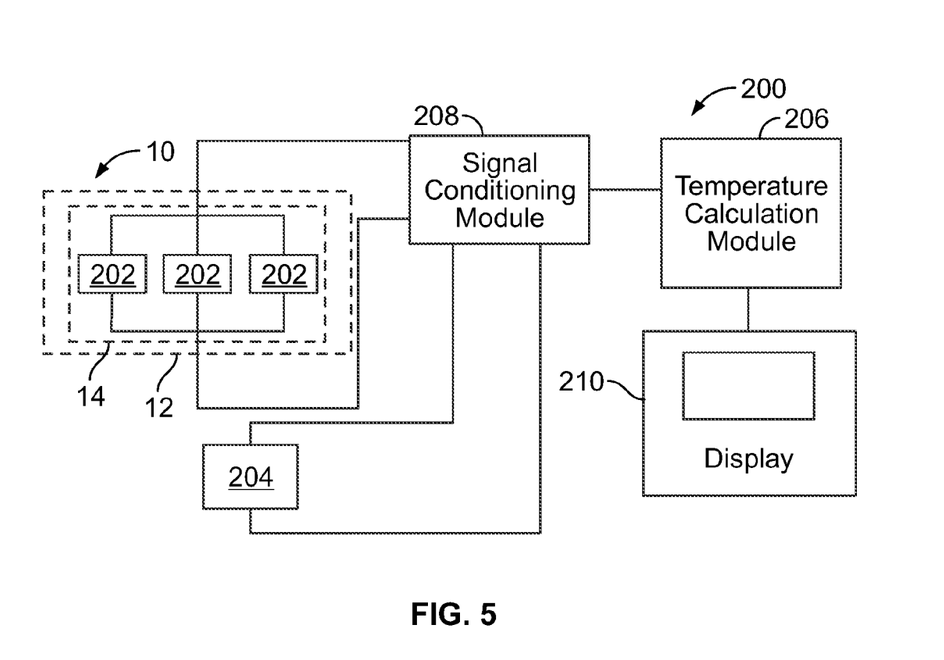
FIG. 5 is a schematic diagram of an exemplary alternative embodiment of a temperature measurement system.

In the exemplary embodiment of FIG. 4, the temperature sensors 102 are interconnected to each other in a series arrangement. But, the temperatures sensors 102 may be connected together in any type of arrangement. For example, the temperatures sensors 102 may be connected together in a parallel arrangement or a combination of a series and parallel arrangement. FIG. 5 is a schematic diagram of an exemplary alternative embodiment of a temperature measurement system 200 illustrating a parallel arrangement of a plurality of temperature sensors 202. The system 200 includes the temperature sensors 202, one or more reference sensors 204, a temperature calculation module 206, an optional signal conditioning module 208, and an optional display module 210. The system 200 is configured to measure a temperature at one or more remote locations of the LED assembly 10 that are remote from the LED junction 26 (FIG. 1), and determine a junction temperature at the junction 26 based on the measured temperature(s) at the remote location(s). The temperature sensors 202 are operatively connected to the LED assembly 10 at the remote location(s) of the LED assembly 10. As can be seen in FIG. 4, the temperature sensors 202 are interconnected to each other in a parallel arrangement. In the exemplary embodiment of FIG. 5, the temperature sensors 202 are thermocouples.

Referring again to FIG. 4, the reference temperature sensor 104 is configured to measure a reference temperature. The reference temperature may be the ambient air temperature proximate the LED assembly 10, or may be the temperature of a component that is external to the LED assembly 10. Examples of components that are external to the LED assembly 10 include, but are not limited to, a base (e.g., a heat sink) that the LED assembly 10 is mounted on, a wall, floor, and/or ceiling of a room or container in which the LED assembly 10 is located, and/or the like. For example, in the exemplary embodiment, the reference temperature sensor 104 is positioned to measure the ambient air temperature adjacent the LED assembly 10. Alternatively, the reference temperature sensor 104 is operatively connected to the external component for measuring the temperature of the external component. Along with the measured temperature(s) at the remote location(s), the temperature calculation module 106 uses the reference temperature to determine the junction temperature at the LED junction 26, as will be described below.

The reference temperature sensor 104 may be any type of sensor. For example, the reference temperature sensor 104 may be, but is not limited to, a thermocouple, an RTD, a smart temperature monitoring integrated circuit, a NTC sensor, a PTC sensor, and/or the like. The system 100 may include any number of the reference temperature sensors 104.

The signal conditioning module 108 is electrically connected to the temperature sensors 102 and to the reference temperature sensor 104. The signal conditioning module 108 is configured to receive signals from the temperature sensors 102 that represent, or relate to, the temperature at the remote location(s) of the temperature sensors 102. Similarly, a signal that represents, or relates to, the reference temperature is received by the signal conditioning module 108 from the reference temperature sensor 104. The signals received by the signal conditioning module 108 are conditioned by the module 108 such that the signals are suitable for processing by the temperature calculation module 106. For example, the signal conditioning module 108 may filter, amplify, convert, range match, and/or isolate the signals received from the sensors 102 and 104. The signal conditioning module 108 may include any suitable components for performing the signal conditioning, such as, but not limited to, filters, amplifiers, magnetic isolation components, optical isolation components, and/or the like.

In the exemplary embodiment, the signal conditioning module 108 supplies electrical power to the sensors 102 and 104 for driving operation thereof. Alternatively, electrical power is supplied to the sensors 102 and/or 104 from another component, such as, but not limited to, the temperature calculation module 106, directly from a power source (not shown), and/or the like. An embodiment wherein the system 100 does not include signal conditioning module 108 is one example of supplying electrical power to the sensors 102 and 104 from such other components.

The temperature calculation module 106 is electrically connected to the signal conditioning module 108 for receiving the conditioned signals of the sensors 102 and 104 from the module 108. The temperature calculation module 106 is adapted to perform one or more processing operations on the conditioned signals. For example, and as will be described in more detail below, the temperature calculation module 106 processes the conditioned signals of the sensors 102 and 104 to determine the junction temperature at the LED junction 26. In some embodiments, the temperature calculation module 106 processes the condition signals of the sensors 102 to determine a difference between the junction temperature and a temperature of a component that is external to the LED assembly 10, such as, but not limited to, a heat sink and/or the like. The conditioned signals may be processed in real-time as the conditioned signals are received from the signal conditioning module 108. Alternatively, the conditioned signals are stored temporarily in a memory 112 of the temperature calculation module 106 and/or an external memory (not shown) for processing at a later time.

The temperature calculation module 106 may be adapted to repeatedly determine the junction temperature of the LED junction 26 over a period of time. Moreover, the temperature calculation module 106 may be adapted to determine the junction temperature of the LED junction 26 during different environmental conditions. Junction temperatures determined by the temperature calculation module 106 may be recorded and stored in the memory 112. In some embodiments, the temperature calculation module 106 may be provided with a self-calibration functionality.

Determination of the junction temperature at the LED junction 26 may be limited to a predetermined temperature range, such as, but not limited to, between approximately 0° C. and approximately 250° C., and/or the like. The temperature calculation module 106 may be adapted such that the temperature range is selectively programmable. Moreover, the temperature calculation module 106 may enable a user to switch between a plurality of different temperature ranges stored within the memory 112 of the module 106. The junction temperature may be determined by the temperature calculation module 106 using any temperature units, such as, but not limited to, Celsius, Fahrenheit, Kelvin, and/or the like. Optionally, the temperature calculation module 106 may be adapted to enable the user to select the temperature unit of the junction temperature.

The display module 110 is electrically connected to the temperature calculation module 106 for displaying, among other things, the determined junction temperature of the LED junction 26. The display module 110 may display the junction temperature using any temperature units. In some embodiments, the display module 110 may indicate a severity of the junction temperature using colored LEDs. For example, a green LED may indicate that the junction temperature is within a predetermined acceptable range, a red LED may indicate that the junction temperature is outside of the acceptable range, and a yellow LED may indicate that the junction temperature is approaching an upper or lower limit of the acceptable range. Moreover, and for example, the display module 110 may include a plurality of LEDs, wherein the value of the junction temperature within a predetermined range is indicated by the number of LEDs that are lit.

The display module 110 may be any type of display, such as, but not limited to, a digital display, an analog display, a liquid crystal display (LCD), an LED display, a plasma display, a cathode ray tube (CRT) display, and/or the like. The display module 110 may be mounted external to the LED assembly 10, or may be mounted on the LED assembly 10. For example, the display module 110 may be mounted on the LED 14 and/or the PCB 12. In some embodiments, the display module 110 may be the display of a computer, workstation, and/or the like. In the exemplary embodiment, the display module 110 is electrically connected to the temperature calculation module 106 via a wired connection 114. Alternatively, the display module 110 is electrically connected to the temperature calculation module 106 via a wireless connection.

In the exemplary embodiment, the display module 110 includes a user interface 118 that enables a user to control operation of the temperature calculation module 106. The user interface 118 may include multiple interface options that the user may physically manipulate to interact with the temperature calculation module 106 to control the module 106 to input information and set and change parameters of the temperature calculation module 106. For example, the user interface 118 may enable the user to request that a current junction temperature of the LED junction 26 be displayed. Moreover, and for example, the user interface 118 may enable the user to select a frequency with which the temperature calculation module 106 determines the junction temperature and/or select a length of time that the temperature calculation module 106 monitors the junction temperature. The user interface 118 may be configured to enable the user to select which units with which the junction temperature is determined and displayed. Another example includes enabling a user to selectively program the predetermined temperature range of the temperature calculation module 106 and/or select between a plurality of predetermined temperature ranges. Enabling the user to initiate a self-calibration feature of the temperature calculation module 106 is yet another example of a possible functionality of the user interface 118.

Examples of the interface options of the user interface 118 include, but are not limited to, a keyboard, a trackball, a mouse, buttons, knobs, a touch screen, and/or the like. In an alternative embodiment, the temperature calculation module 106 includes the user interface 118.

Optionally, a portion or all of the temperature measurement system 100 is a handheld or hand-carried device and/or is configured to be carried in a person's hand, pocket, briefcase-sized case, backpack, and/or the like. For example, the components 106, 108, and/or 110 of the temperature measurement system 100 may be housed in a housing that is a hand-carried device having the size of a typical laptop computer.

Figure 6:
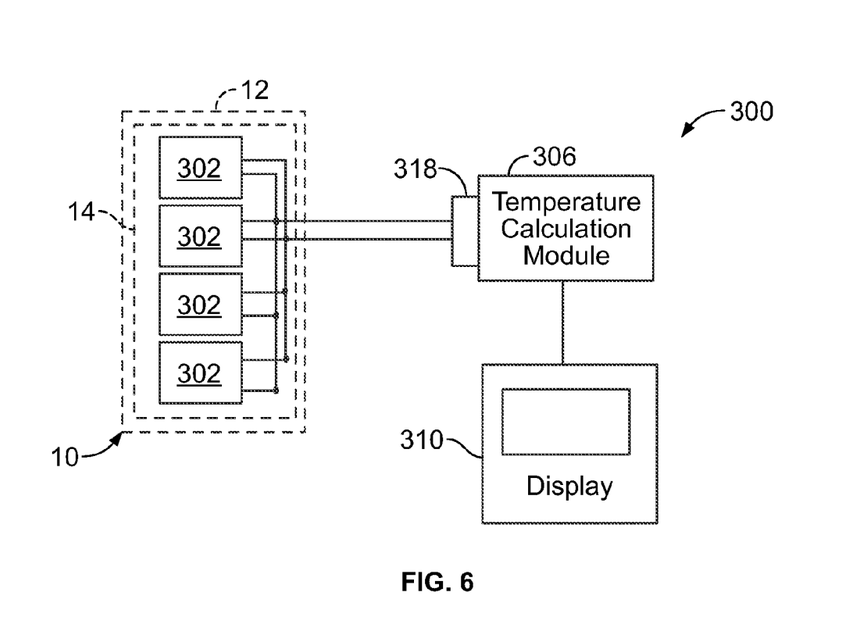
FIG. 6 is a schematic diagram of another exemplary alternative embodiment of a temperature measurement system.

FIG. 6 is a schematic diagram of another exemplary alternative embodiment of a temperature measurement system 300 illustrating another arrangement of a plurality of temperature sensors 302. The system 300 includes the temperature sensors 302, a temperature calculation module 306, and an optional display module 310. The system 300 measures a temperature at one or more remote locations of the LED assembly 10 that are remote from the LED junction 26 (FIG. 3), and determines a junction temperature at the junction 26 based on the measured temperature(s) at the remote location(s). In the exemplary embodiment of FIG. 6, the temperature sensors 302 are each smart temperature monitoring integrated circuits. Optionally, the temperature sensors 302 are addressable such that each sensor 302 has a unique address. In the exemplary embodiment, the temperature sensors 302 are electrically connected to the temperature calculation module 306 using a serial communication bus 318 of the temperature calculation module 306, such as, but not limited to, an $I^2C$ serial interface, an SPI serial interface, an RS-232 serial interface, a UART serial interface, and/or the like. In some embodiments, the temperature calculation module 306 is configured as a Master and each of the temperature sensors 302 is configured as a Slave.

The system 300 shown in FIG. 6 does not include a signal conditioning module. Instead, signal conditioning of the signals that represent, or relate to, the measured temperature at the remote location(s) is performed within the temperature sensors 302 for processing by the temperature calculation module 306. Moreover, a reference temperature sensor is also not included in the system 300 because the temperature sensors 302 internally compensate for the reference temperature.

Figure 7:
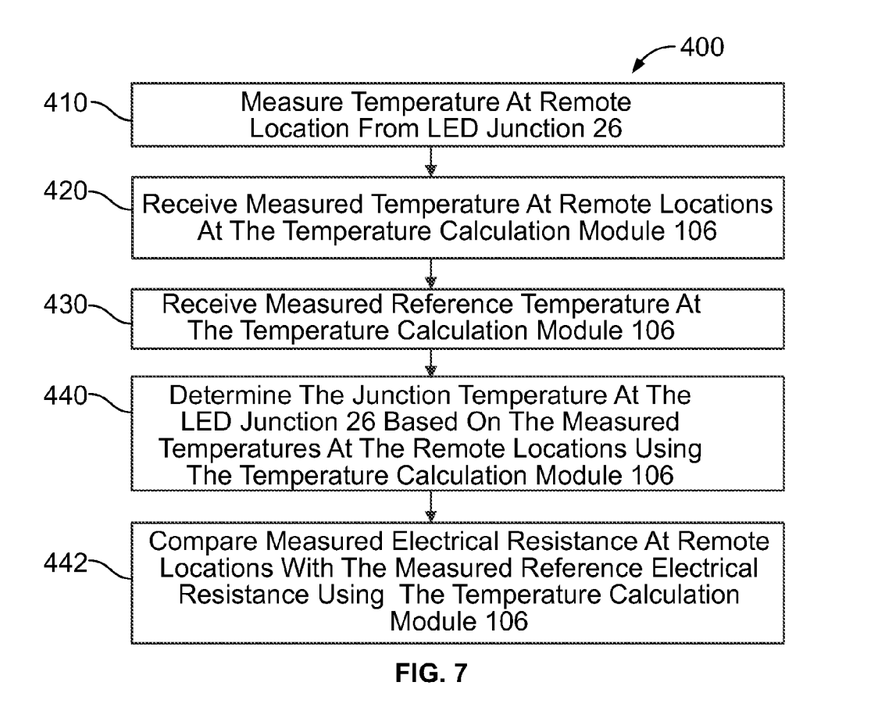
FIG. 7 is a flowchart illustrating an exemplary embodiment of a method for determining the junction temperature of the LED assembly shown in FIG. 1 using the temperature measurement systems described and/or illustrated herein.

FIG. 7 is a flowchart illustrating an exemplary embodiment of a method 400 for determining the junction temperature of the LED assembly 10 using the temperature measurement systems described and/or illustrated herein. The method will be described with reference to the temperature measurement system 100 shown in FIG. 3. However, it should be understood that the method 400 may be practiced using the systems 200 and 300 (as well as any embodiments not specifically illustrated herein), which may or may not include suitable modifications to the method 400 based on the specific system used.

The method 400 includes measuring 410 one or more temperatures at one or more remote locations of the LED assembly 10 that are remote from the LED junction 26 (FIG. 1) using the temperature sensors 102 (FIG. 3). The remote locations of the LED assembly 10 are described above with reference to the temperature sensors 102 of FIG. 3. As described above, any number of the temperature sensors 102 may be used to measure the temperature at any number of remote locations. The method 400 further includes receiving 420 the measured temperatures at the remote locations of the LED assembly 10 at the temperature calculation module 106 (FIG. 3). Optionally, the measured temperatures received by the temperature calculation module 106 are first conditioned by the signal conditioning module 108 (FIG. 3) as described above. In some embodiments, a measured temperature received by the temperature calculation module 106 is an actual temperature, while in other embodiments the measured temperature received by the module 106 is a measured electrical resistance of the corresponding temperature sensor 102 at the corresponding remote location. Alternatively, the measured temperature received by the temperature calculation module 106 is a voltage output of the corresponding temperature sensor 102 at the corresponding remote location.

In the exemplary embodiment, the method 400 also includes receiving 430 the measured reference temperature from the reference temperature sensor 104 (FIG. 3) at the temperature calculation module 106. The measured reference temperature received by the temperature calculation module 106 is optionally first conditioned by the signal conditioning module 108 as described above. Similar to the received measured temperatures at the remote locations, the measured reference temperature may be an actual temperature, a measured electrical resistance of the reference temperature sensor 104, and/or a voltage output of the reference temperature sensor 102.

The junction temperature at the LED junction 26 is determined 440 by the temperature calculation module 106 based on the measured temperatures at the remote locations. More particularly, the measured temperatures at the remote locations are compared with the measured reference temperature using a predetermined relationship to determine 440 the junction temperature at the LED junction 26. For example, in the exemplary embodiment, the measured electrical resistances at the remote locations are compared with a measured reference electrical resistance of the reference temperature sensor 104 to determine 440 the junction temperature. Moreover, and for example, in other embodiments actual temperatures at the remote locations are compared with an actual reference temperature of the reference temperature sensor 104 to determine 440 the junction temperature. In still other embodiments, and for example, voltage outputs of the temperature sensors 102 are compared with a voltage output of the reference temperature sensor 104 to determine 440 the junction temperature.

As described above, in the exemplary embodiment, determining 440 the junction temperature includes comparing 442 the measured electrical resistances at the remote locations with the measured reference electrical resistance. The predetermined relationship between the electrical resistances that is used to determine 440 the junction temperature is based on the Callendar-Van Dusen equation. For example, in the exemplary embodiment, the junction temperature is determined 440 using the equation: $R_t = R_i(1 + \alpha_T T_j)$; wherein:

$R_t$=the measured electrical resistances at the remote location;

$R_i$=the reference electrical resistance;

$\alpha_T$=error; and $T_j$=the junction temperature.

The error $\alpha_T$ may be selected to have any value, such as, but not limited to, between approximately 0.1° and 5° C. Optionally, the value of the error $\alpha_T$ is selectively programmable by the user using the user interface 118 (FIG. 4). Other relationships, equations, and/or the like may be used to determine 440 the junction temperature by comparing the measured electrical resistances of the sensors 102 and 104. Moreover, it should be appreciated by one skilled in the art that the Callendar-Van Dusen equation may be used as a basis to determine the junction temperature by comparing actual temperatures or voltage outputs in a similar manner to that described herein with respect to comparing measured electrical resistances. Accordingly, determining 440 the junction temperature by comparing actual temperatures or voltage outputs will not be described in more detail herein.

The junction temperature may be monitored by the temperature calculation module 106 over a period of time and/or during different environmental conditions. Based on the monitoring, the effect of different operating conditions affecting the junction temperature at the LED junction 26 can be observed, determined, and/or the like. Moreover, a reliability and/or an estimated life span of the LED assembly 10 can be observed, determined, and/or the like. Monitoring the junction temperature may also enable optimization of the size of a heat sink that carries heat away from the LED 14.

Various embodiments provide a system and method for determining the junction temperature of an LED. For example, by practicing at least one of the embodiments, a temperature at a remote location of the LED assembly that is remote from a junction of the LED is measured, and a junction temperature of the junction within the LED is determined based on the measured temperature at the remote location. A technical effect of at least one embodiment is that the junction temperature can be monitored to determine if enough heat is being drawn away from the LED to prevent an increased rate of light output degradation.

The foregoing detailed description of certain embodiments of the subject matter described and/or illustrated herein will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the functionality of the modules, displays, and/or other components described and/or illustrated herein may be stand alone programs, may be incorporated as subroutines in an operating system, may be functions in an installed software package, and the like. It should be understood that the various embodiments are not limited to the arrangements and instrumentality shown and/or described herein.

The modules of the various embodiments described and/or illustrated herein may be implemented in hardware, software or a combination thereof. The modules described and/or illustrated herein may be implemented utilizing any combination of dedicated hardware boards, DSPs, processors, etc. Alternatively, the modules described and/or illustrated herein may be implemented utilizing an off-the-shelf PC with a single processor or multiple processors wherein the functional operations distributed between the processors. As a further option, the modules described and/or illustrated herein may be implemented utilizing a hybrid configuration in which certain modular functions are performed utilizing dedicated hardware, while the remaining modular functions are performed utilizing an off-the-shelf PC and/or the like. The modules described and/or illustrated herein also may be implemented as software modules within a processing unit. The modules described and/or illustrated herein may be implemented as part of one or more computers or processors. The computer or processor may include a computing device, an input device, a display module and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a floppy disk drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the terms "computer" or "module".

The computer or processor executes a set of instructions that are stored in one or more storage elements, in order to process input data. The storage elements may also store data or other information as desired or needed. The storage element may be in the form of an information source or a physical memory element within a processing machine. The set of instructions may include various commands that instruct the computer or processor as a processing machine to perform specific operations such as the methods, steps, and/or processes of the various embodiments described and/or illustrated herein. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the subject matter described and/or illustrated herein is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A temperature measurement system for a light emitting diode (LED) assembly that includes an LED having two semiconductors joined together at an LED junction, said system comprising:
   a temperature sensor operatively connected to the LED assembly at a remote location that is remote from the LED junction, the temperature sensor being configured to measure a temperature of the LED assembly at the remote location, wherein the measured temperature at the remote location is an actual temperature or is a measured electrical resistance of the temperature sensor at the remote location; and
   a temperature calculation module operatively connected to the temperature sensor for receiving the measured temperature at the remote location from the temperature sensor, the temperature calculation module being configured to determine a junction temperature at the LED junction based on the measured temperature at the remote location.

2. The system according to claim 1, wherein the temperature calculation module is configured to determine the junction temperature based on the measured temperature at the remote location using the measured electrical resistance at the remote location.

3. The system according to claim 1, wherein the temperature calculation module is configured to determine the junction temperature based on the measured temperature at the remote location by comparing the measured electrical resistance at the remote location with a reference electrical resistance.

4. The system according to claim 1, wherein the temperature calculation module is configured to determine the junction temperature by comparing the actual temperature at the remote location with a reference temperature.

5. The system according to claim 1, wherein the temperature calculation module is configured to determine the junction temperature based on the measured temperature at the remote location using the equation: $R_t=R_i(1+\alpha_T T_j)$; wherein:
   $R_t$=the measured electrical resistance at the remote location;
   $R_i$=a reference electrical resistance;
   $\alpha_T$=error; and
   $T_j$=the junction temperature.

6. The system according to claim 1, wherein the temperature sensor comprises at least one of a thermocouple, a smart temperature monitoring integrated circuit, a positive temperature coefficient (PTC) sensor, a negative temperature coefficient (NTC) sensor, or a resistance temperature detector (RTD).

7. The system according to claim 1, wherein the LED comprises a body, the temperature sensor being operatively connected to the body of the LED.

8. The system according to claim 1, wherein the LED comprises a body having a pair of electrical contacts and a thermal pad extending between the electrical contacts, the temperature sensor being operatively connected to the thermal pad of the body.

9. The system according to claim 1, wherein the LED comprises a body having a case that includes a thermal pad, the thermal pad extending outwardly past an edge of the case, the temperature sensor being operatively connected to the thermal pad at a portion of the thermal pad that extends past the edge.

10. The system according to claim 1, wherein the temperature sensor comprises a plurality of temperature sensors that are interconnected to each other in at least one of a series or a parallel arrangement.

11. The system according to claim 1, wherein the measured temperature at the remote location is an operating temperature of the LED assembly.

12. The system according to claim 1, wherein the determined junction temperature at the LED junction has a different value than the measured temperature at the remote location.

13. A method for determining the junction temperature of a light emitting diode (LED) assembly that includes an LED having two semiconductors joined together at an LED junction, said method comprising:

measuring a temperature at a remote location of the LED assembly that is remote from the LED junction using a temperature sensor, wherein the measured temperature at the remote location is an actual temperature or is a measured electrical resistance of the temperature sensor at the remote location;

receiving the measured temperature at the remote location of the LED assembly at a temperature calculation module; and determining the junction temperature at the LED junction of the LED assembly based on the measured temperature at the remote location using the temperature calculation module.

14. The method according to claim 13, wherein determining the junction temperature comprises using the measured electrical resistance at the remote location.

15. The method according to claim 13, wherein determining the junction temperature comprises comparing the measured electrical resistance at the remote location with a reference electrical resistance.

16. The method according to claim 13, wherein determining the junction temperature comprises comparing the actual temperature at the remote location with a reference temperature.

17. The method according to claim 13 wherein determining the junction temperature comprises using the equation: $R_t = R_i(1+\alpha_T T_j)$; wherein:

$R_t$=the measured electrical resistance at the remote location;

$R_i$=a reference electrical resistance;

$\alpha_T$=error; and $T_j$=the junction temperature.

18. The method according to claim 13, wherein measuring a temperature at a remote location of the LED assembly comprises measuring an operating temperature of the LED assembly at the remote location of the LED assembly.

19. The method according to claim 13, wherein the determined junction temperature at the LED junction has a different value than the measured temperature at the remote location.

20. A light emitting diode (LED) assembly comprising:

an LED comprising a body having a mounting side configured to be mounted on a printed circuit board, the mounting side having an edge, the body comprising an electrical contact extending along the mounting side and a thermal pad extending along the mounting side proximate the electrical contact, the thermal pad extending outwardly on the mounting side past the edge; and a temperature sensor operatively connected to the body of the LED at a portion of the thermal pad that extends past the edge.

21. The LED assembly according to claim 20, wherein the electrical contact comprises a pair of electrical contacts spaced apart along the body of the LED, the thermal pad extending between the electrical contacts.

22. The LED assembly according to claim 20, further comprising a temperature calculation module operatively connected to the temperature sensor for receiving a voltage output of the temperature sensor, the temperature calculation module being configured to determine a junction temperature at an LED junction of the LED using the voltage output of the temperature sensor.

* * * * *